United States Patent [19]

Pritzkow et al.

[11] Patent Number: 4,496,841

[45] Date of Patent: Jan. 29, 1985

[54] RADIATION DETECTOR WITH RESONANT FREQUENCY TRANSLATOR

[75] Inventors: Dennis H. Pritzkow, New Berlin; Robert M. Vavrek, Waukesha, both of Wis.

[73] Assignee: General Electric Company, Milwaukee, Wis.

[21] Appl. No.: 481,420

[22] Filed: Apr. 1, 1983

[51] Int. Cl.[3] .................... G03B 41/16; G01T 1/185

[52] U.S. Cl. .................................. 250/374; 250/385

[58] Field of Search ................ 378/19; 250/374, 385, 250/389

[56] References Cited

U.S. PATENT DOCUMENTS

| | | | |
|---|---|---|---|
| 3,991,312 | 11/1976 | Whetten et al. | 378/19 |
| 4,200,794 | 4/1980 | Newberry | 250/492.2 |
| 4,348,589 | 9/1982 | Vis | 250/385 |
| 4,405,863 | 9/1983 | Pritzkow et al. | 250/385 |

*Primary Examiner*—Alfred E. Smith
*Assistant Examiner*—Carolyn E. Field
*Attorney, Agent, or Firm*—Alexander M. Gerasimow; Douglas E. Stoner

[57] ABSTRACT

The radiation detector employs a rigid stiffener plate fastened to the detector housing to translate the housing resonant frequency outside the band of frequencies associated with the detector signals containing imaging information. In this manner, microphonic noise induced by the resonating housing does not interfere with the desired signals and does not degrade image quality.

15 Claims, 4 Drawing Figures

RADIATION DETECTOR WITH RESONANT FREQUENCY TRANSLATOR

BACKGROUND OF THE INVENTION

This invention relates to radiation detectors for detecting ionizing radiation, such as X-ray and gamma radiation. More specifically, this invention relates to multi-cell X-ray detectors of the type used in medical diagnostic apparatus, such as computerized tomography (CT) scanners.

U.S. Pat. No. Re. 30,644, issued to Whetten, et al, and U.S. Pat. No. 4,119,853, issued to Shelley et al (both of which are assigned to the same assignee as the present invention and both of which are incorporated herein by reference) disclose and claim multi-cellular X-ray detectors of the type suitable for use with CT scanners. Generally, the detector is composed of a plurality of detector cells defined by radiation-opaque electrode plates supported between a pair of parallel ceramic substrates which are in turn secured to upper and lower metallic frame members of a detector-array assembly. The detector is positioned within a detector housing which contains a pressurized ionizable gas, such as xenon. In operation, alternate ones of the electrode plates (bias electrodes) are connected to a source of electric potential of about 500 volts, while the remaining electrodes (signal electrodes) are maintained at ground potential. X-ray or gamma radiation, intensity modulated by passage through an object undergoing examination, entering a detector cell ionizes the xenon gas to create photoelectron/ion pairs which are collected by the signal electrode inducing therein a current proportional to the intensity of the ionizing radiation. The current thusly induced in each signal electrode is coupled to external instrumentation, including digital computer means, for processing in a well-known manner to reconstruct transverse images of the object.

To obtain good image quality in the reconstructed images, particularly in computerized tomography, the detector must measure X-ray photons efficiently and with a high degree of resolution. Good spatial resolution is obtained by spacing the electrode plates closely and uniformly over the entire length of the detector. It is also important for each cell to have identical and stable detecting characteristics. Ideally, the output signal from a detector cell should comprise only the signal due to excitation by ionizing radiation. In practice, however, a spurious output signal is frequently superimposed on the desired signal. This spurious signal, generally referred to as microphonic noise, can be traced to the construction of the detector. The electrodes are fabricated from thin metal plates positioned in close proximity to one another with a relatively large potential difference between them. Mechanical vibrations transmitted to the plates may significantly vary the capacitance between electrodes and, thus, introduce spurious currents in the signal electrodes. These spurious currents are generated during active scans and are detected along with the desired currents by the current-sensing electronics, causing errors in the X-ray-intensity measurements. Although the spurious currents are small (on the order of picoamperes), they are nevertheless significant compared to the X-ray-induced signals and manifest themselves as image-degrading artifacts in the reconstructed images.

It is, therefore, an object of the present invention to provide a multi-cellular, ionizing radiation detector with significantly reduced sensitivity to mechanical vibrations.

It is another object of the invention to reduce detector sensitivity to microphonic noise by means which is easily removable and replaceable and which is readily adaptable to a variety of detector designs.

It is still another object of the invention to reduce detector sensitivity to mechanical vibrations by means which is easily replaceable, allowing changes in the design thereof to match changes in the detector parameters with minimum impact on image quality.

It is a further object of the invention to reduce the sensitivity of the detector to interference from microphonic noise by means which is easily replaceable so as to allow its replacement with minimum impact on detector design and manufacturability.

SUMMARY OF THE INVENTION

The radiation detector in accordance with the invention includes a housing and detector means supported therewithin for detecting radiation admitted into the housing and providing in response thereto a plurality of electrical signals lying within a band of frequencies. A means is also provided to modify the resonant frequency of the housing so as to place it substantially outside the band of frequencies of the electrical signals so as to avoid interference therewith.

BRIEF DESCRIPTION OF THE DRAWING

The features of the invention believed to be novel are set forth with particularity in the appended claims. The invention itself, however, both as to its organization and method of operation, together with further objects and advantages thereof, may best be understood by reference to the following description taken in conjunction with the accompanying drawings in which:

DETAILED DESCRIPTION OF THE INVENTION

Figure 1:
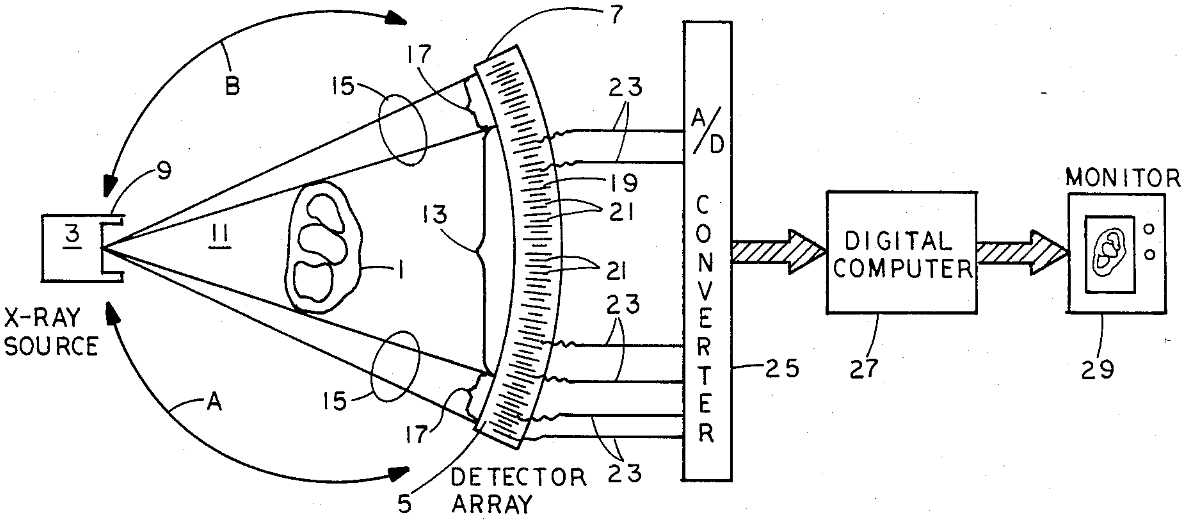
FIG. 1 depicts schematically a computerized tomography system with respect to which the preferred embodiment of the invention is disclosed.

FIG. 1 is a schematic illustration of an X-ray source and a radiation detector in a computerized tomography system with respect to which the preferred embodiment of the invention will be disclosed. A body 1 undergoing examination is interposed between an X-ray source 3 and an array of X-ray detectors, generally designated 5, supported within a detector housing 7. In a typical system, the detector housing may, for example, be filled with an ionizable gas, such as xenon, at a pressure of between approximately 10 atmospheres and approximately 100 atmospheres. X-ray source 3 typically includes a collimation means 9 which functions to confine the X-ray energy emanating from the source to a substantially planar, fan-shaped beam 11. A central sector of X-ray beam 11 irradiates body 1 and is transmitted therethrough to a group 13 of ionization chamber cells in the center of array 5. The angle of the X-ray beam is larger than the angles subtended by body 1 so that two peripheral sectors 15 of beam 11 are transmitted past the body without substantial attenuation to two groups of reference ionization chamber cells 17 at the periphery of array 5. In a typical array, central group of cells 13 may, for example, comprise as many as 730 separate ionization chamber cells, while each of the peripheral detector cell groups 17 may comprise a group of six independent ionization chamber cells.

Each cell in the array is made up of a pair of positively charged anode plates 19 and a negatively charged cathode plate 21 interposed therebetween forming an ionization chamber. In operation, X-ray photons entering the ionization chamber interact with the xenon gas to produce photoelectron/ion pairs. The positively charged ions are collected at signal electrodes 21 and induce a signal current therein indicative of the X-ray intensity, while the photoelectrons are collected at anodes 19. X-ray cross talk between adjacent cells is reduced due to the fact that the anodes and cathodes are constructed from such X-ray-opaque materials as either tantalum or tungsten. The electrical signal obtained at each signal electrode 21 is produced solely by X-ray energy entering a single detector cell. In order to obtain X-ray attenuation data from many different angles (needed to reconstruct a CT cross-sectional image), the X-ray source and the detector array are caused, in one embodiment of scan geometries, to rotate jointly either clockwise or counterclockwise about the body, as suggested by arrows A and B in FIG. 1.

A preferred embodiment of the detector array suitable for use in a computerized tomography apparatus is disclosed and claimed in U.S. Pat. No. 4,277,680, issued June 9, 1981 to D. J. Cotic, which is assigned to the same assignee as the present invention and which is incorporated herein by reference. In this embodiment (not shown) the detector array is made up of a plurality of detector modules each having upper and lower ceramic substrates for supporting therebetween the anode and cathode plates. The detector modules are rigidly and releasably fastened by means of threaded fasteners to the frame of the detector array, permitting the modules to be quickly and easily removed and replaced as necessary.

Signals from each detector cell in central group 13 and peripheral group of cells 17 in FIG. 1 flow into separate data-acquisition channels, such as those generally designated 23, for conversion to digital form by analog-to-digital converter 25 for processing by a digital computer 27 to produce cross-sectional images of body 1 using techniques well known to the art. The reconstructed images may be displayed on a television monitor 29, for example. The signals provided by the peripheral detector cells are utilized to calibrate the detector array. These signals may also be used, for example, to compensate for variations in the intensity of X-ray source 3, as disclosed and claimed in U.S. Pat. Nos. 4,068,306 and 4,070,707, both assigned to the same assignee as the present invention.

Figure 2:
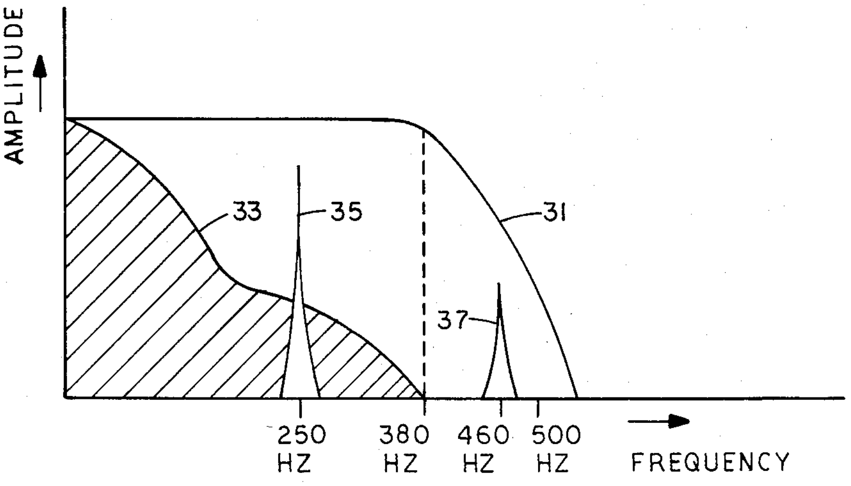
FIG. 2 illustrates graphically the interference of spurious microphonic noise signals with the desired imaging signals.

In order to improve the signal-to-noise ratio of the signals corresponding to the intensity of the X-ray attenuation data (and, hence, image quality), the system electronics are designed to pass only a limited band of frequencies associated with the imaging signals. This is graphically depicted in FIG. 2 in which the pass band of the system is illustrated by means of curve 31, while the imaging signals are generally defined by the curve designated with the reference numeral 33. Curve 31 has a roll off at approximately 380 Hz, as indicated along the horizontal axis, so that signals having frequencies lower than about 380 Hz (such as the desired imaging signals) pass without substantial attenuation, while signals having frequencies between 380 Hz and 500 Hz are increasingly attenuated. Signals above approximately 500 Hz are not passed at all. It will be recognized, however, that undesirable signals, such as microphonic noise, having a frequency of less than 380 hz. will also be transmitted and will act to degrade image quality. It has been found that one such signal 35, occurring at approximately 250 Hz, is due to microphonic noise produced as a result of the natural resonance of detector housing 7 and the detector array 5 positioned within the housing. The resonance is induced by mechanical vibration of the detector housing and is transmitted to the thin plates of the detector array which then also vibrate at the same frequency and produce microphonic currents as described hereinbefore. In accordance with the invention, the natural resonant frequency of the detector housing is modified such that the resonant frequency thereof is shifted outside the band of frequencies associated with the desired imaging signals. In one embodiment, resonant peak 35 was shifted upward in frequency from 250 Hz to 460 Hz (peak 37, FIG. 2) so as to significantly reduce interference with the desired signals having frequencies below 380 Hz.

Figure 3:
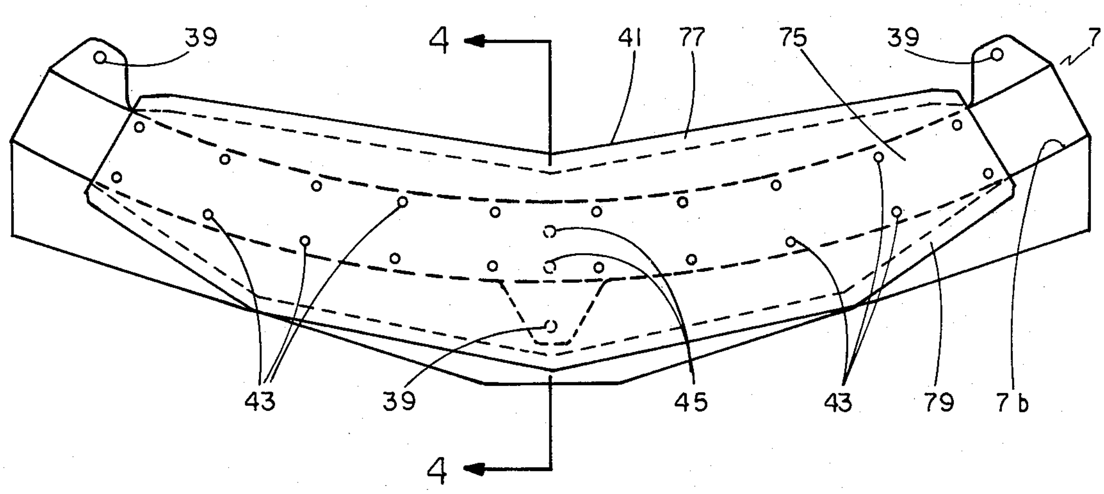
FIG. 3 is an elevation view of a detector housing, including the means in accordance with the invention to modify the housing resonant frequency.
Figure 4:
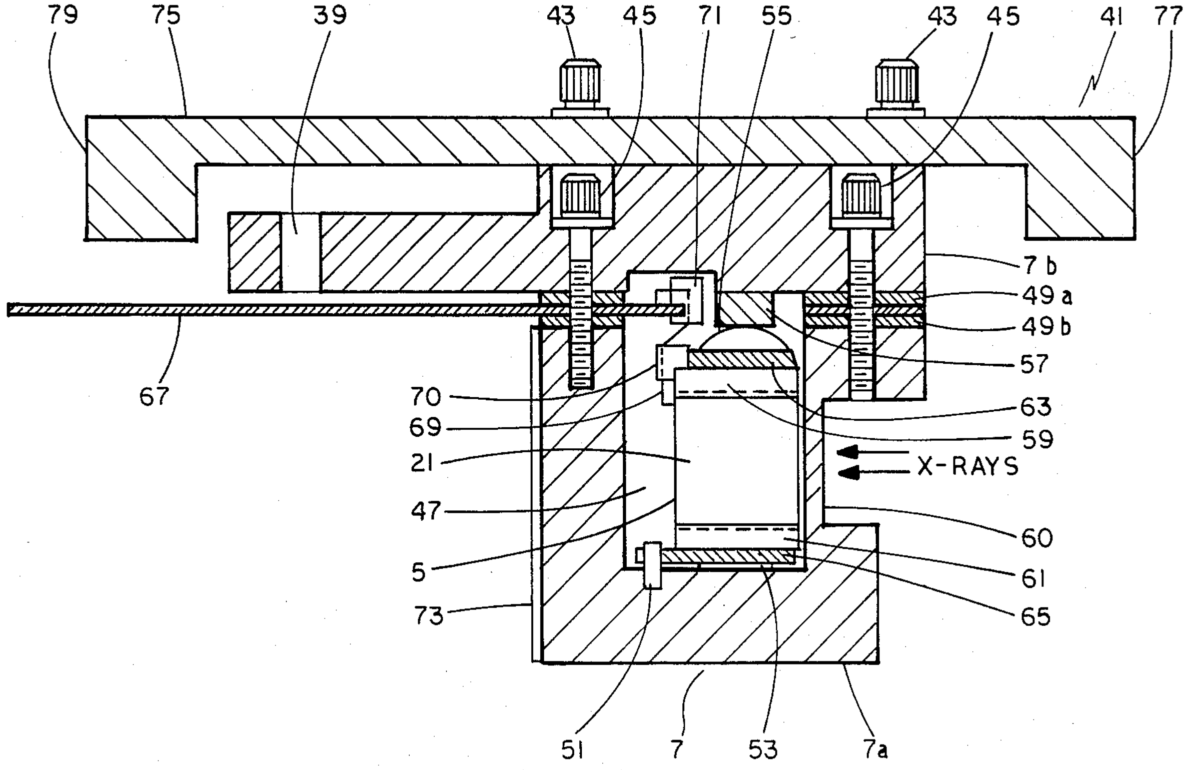
FIG. 4 is a cross-sectional view of the detector housing taken along line 4—4 of FIG. 3.

The manner in which the resonant frequency of the detector housing is modified in accordance with the invention may be best understood if reference is made to FIG. 3 and to FIG. 4 which is a cross-sectional view of FIG. 3 taken along line 4—4 of FIG. 3. Referring now to FIGS. 3 and 4, it will be seen that housing 7 (which is preferably fabricated from aluminum) is composed of a lower half **7*a* and an upper half or cover 7*b* which is fastened to the lower half by means of a plurality of fasteners, such as threaded fasteners 45, to form a cavity 47 for holding an ionizable gas therein. Since cavity 47 is pressurized, a pair of seal rings 49*a* and 49*b* is interposed between housing members 7*a* and 7*b* to provide a hermetic seal. Detector array 5 is positioned in cavity 47 with the aid of locating pins, such as that designated 51, in close proximity to the radiation-receiving window 60 which is fabricated from aluminum and which is substantially transparent to X-ray radiation. The detector is supported within the housing from below by a layer of material 53, such as Mylar, which insulates the detector electrically and mechanically from the housing. Leaf springs, such as spring 55, biased against a pusher bar 57 on housing cover 7*b***, hold the detector firmly in place.

The electrodes comprising the detector, such as signal electrode 21 in FIG. 4, for example, are supported between ceramic substrates 59 and 61 which are fastened to the stainless-steel frame members 63 and 65, respectively. Each of the signal electrodes is connected to printed circuit board 67 situated between seals **49*a* and 49*b* by means of fine-wire leads 69 which are held in place by a slotted member 70 secured to the insulating substrate 59, and a similar slotted member 71 secured to printed circuit board 67. Members 70 and 71 hold leads 69 firmly in place and apart from one another. Thus, in a manner more fully described in the afore-identified U.S. Pat. No. 4,119,853, the individual signal electrodes are connected to outside signal-processing apparatus, such as analog-to-digital converter 25 (FIG. 1**).

An optional lead plate 73 (FIG. 4) may be provided on the rear wall of the housing to absorb any radiation passing through the detector unattenuated. As best seen in FIG. 3, the detector housing is also provided with apertures 39 for securing the detector to shock mounts (not shown) on a rotating gantry (not shown) of a computerized tomography system. The details of gantry construction may be ascertained by reference to U.S. Pat. Nos. 4,112,303 and 4,115,695, both of which are assigned to the same assignee as the present invention.

Continuing with reference to FIG. 3, a stiffener plate, generally designated 41, for modifying the resonant frequency of the housing is secured to cover plate 7*b* by means of a plurality of fasteners, such as threaded fasteners 43 (FIG. 4). In the preferred embodiment, the fasteners are spaced at about equal intervals along the entire length of the stiffener plate so as to securely fasten it to the housing, such that together they act as an integral assembly in response to mechanical vibrations. Alternatively, the stiffener plate may be fastened to the housing only at the antinodes (points of maximum displacement when the housing resonates), since the nodes (points of minimal displacement) remain relatively stationary. The stiffener plate changes the mass and the rigidity of the detector housing and thereby changes the resonant frequency thereof. Preferably, the stiffener plate is fabricated from aluminum, but may also be fabricated from other rigid materials having a coefficient of thermal expansion which matches that of the material used in the detector housing.

The particular geometrical configuration of the stiffener plate is not critical to translate the resonant frequency of the housing in accordance with the invention, provided the following guidelines are observed. Preferably, the design of the stiffener plate should be such that it may be attached to the detector housing without any modification to the housing. The stiffener plate should also clear all adjoining parts so as to allow free rotation of the rotating gantry. In general, the resonant frequency of the housing increases with increased rigidity of the stiffener plate. The resonant frequency, however, decreases with increased stiffener mass. In order to increase the resonant frequency of the housing so as to place it outside the band of frequencies of the imaging signals, for example, it was necessary to have a stiffener structure with maximum rigidity and low mass. To this end, as best seen in FIG. 4, in the preferred embodiment, the stiffener is configured as one half of an I-beam having a flat top portion 75 and down-turned, depending front and rear flanges 77 and 79 extending along the length thereof to provide rigidity. As described hereinbefore, with reference to FIG. 2, the effect of the stiffener plate 41 is to shift the resonant frequency of the housing from 250 Hz to approximately 460 Hz which lies outside the band of frequencies associated with the imaging signals. In this manner, the degrading effect of microphonic noise produced by the vibrating electrodes is significantly reduced.

From the foregoing, it will be appreciated that a salient feature of the means for translating the resonant frequency of the detector housing is that it is removable, allowing change in the stiffener design to match any changes in the detector-housing parameters. The stiffener-housing combination can be easily fine tuned to the best frequency for minimum impact on image quality. Additionally, the boltable feature allows for changes in the stiffener design with minimum impact on detector design and manufacturability.

While this invention has been described with reference to particular embodiments and examples, other modifications and variations will occur to those skilled in the art in view of the above teachings. Accordingly, it should be understood that within the scope of the appended claims the invention may be practiced otherwise than is specifically described.

The invention claimed is:

1. A radiation detector comprising:

a housing;

detector means supported within said housing for detecting ionizing radiation admitted into said housing and providing in response thereto a plurality of electrical signals lying within a band of frequencies, said detector means and said housing being jointly resonant at a predetermined frequency; and means secured to said housing for modifying said resonant frequency so as to place it substantially outside the band of frequencies of said electrical signals to avoid interference therewith.

2. The radiation detector of claim 1 wherein said detector means comprises:

an ionizable gas held within said housing; and a plurality of detector cells immersed in said ionizable gas.

3. The radiation detector of claim 2 wherein said ionizable gas comprises xenon gas.

4. The radiation detector of claim 2 wherein said means for modifying comprises a stiffener plate secured to said housing so as to modify said resonant frequency.

5. The radiation detector of claim 4 wherein said stiffener plate is selected so as to modify the rigidity and mass of said housing thereby to modify said resonant frequency.

6. The radiation detector of claim 4 wherein said housing and said stiffener plate are fabricated from materials having matching coefficients of thermal expansion.

7. The radiation detector of claim 6 wherein said housing and said stiffener plate are fabricated from aluminum.

8. The radiation detector of claim 4 wherein said stiffener plate is rigidly and releasably secured to said housing.

9. The radiation detector of claim 8 wherein said stiffener plate is secured to said housing means of threaded fasteners.

10. The radiation detector of claim 4 wherein said stiffener plate is configured to have a flat top and depending front and rear flanges extending along the length thereof to provide rigidity, said stiffener plate being fastened to said housing along said flat top portion thereof.

11. The radiation detector of claim 10 wherein said stiffener plate is rigidly and releasably secured to said housing.

12. The radiation detector of claim 11 wherein said stiffener plate is secured to said housing means of threaded fasteners.

13. The radiation detector of claim 10 wherein said housing and said stiffener plate are fabricated from aluminum.

14. The radiation detector of claim 10 wherein said housing and said stiffener plate are fabricated from materials having matching coefficients of thermal expansion.

15. The radiation detector of claim 10 wherein said stiffener plate is selected so as to modify the rigidity and mass of said housing thereby to modify said resonant frequency.

* * * * *